(12) United States Patent
Keyser et al.

(10) Patent No.: US 8,453,334 B2
(45) Date of Patent: Jun. 4, 2013

(54) FUEL CELL PLATE MEASUREMENT FEATURES

(75) Inventors: Mark W. Keyser, Bloomfield, NY (US); Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 13/022,032

(22) Filed: Feb. 7, 2011

(65) Prior Publication Data
US 2012/0198714 A1 Aug. 9, 2012

(51) Int. Cl.
*G01B 5/26* (2006.01)
(52) U.S. Cl.
USPC .................. 33/121; 33/562; 33/701
(58) Field of Classification Search
USPC .................. 33/121, 403, 562, 563, 700, 701
See application file for complete search history.

(56) References Cited

U.S. PATENT DOCUMENTS

| | | | | |
|---|---|---|---|---|
| 1,780,237 | A * | 11/1930 | Leslie | 33/121 |
| 6,219,930 | B1 * | 4/2001 | Reid | 33/562 |
| 7,615,302 | B2 * | 11/2009 | Furukawa et al. | 33/403 |
| 7,765,704 | B2 * | 8/2010 | Cline et al. | 33/286 |
| 2009/0128293 | A1 * | 5/2009 | Braun | 33/700 |
| 2012/0042531 | A1 * | 2/2012 | Brady | 33/403 |

* cited by examiner

*Primary Examiner* — G. Bradley Bennett
(74) *Attorney, Agent, or Firm* — Fraser Clemens Martin & Miller LLC; J. Douglas Miller

(57) ABSTRACT

A method for measuring a plate for a fuel cell stack includes providing a model of the plate including a first axis and a second axis. The model has at least one theoretical measurement feature with a theoretical set of coordinates. The plate is also provided with at least one measurement feature. The first axis and the second axis are established relative to the plate. The at least one measurement feature of the plate is then located relative to the first axis and the second axis. The at least one measurement feature is measured to determine a first set of coordinates for the at least one measurement feature. The first set of coordinates of the plate is compared to the theoretical set of coordinates of the model to determine a displacement of the first set of coordinates from the theoretical set of coordinates.

20 Claims, 2 Drawing Sheets

FUEL CELL PLATE MEASUREMENT FEATURES

FIELD OF THE INVENTION

The present disclosure relates to plates for fuel cells and more particularly to a method for measuring dimensions of the plates during a manufacture thereof.

BACKGROUND OF THE INVENTION

A fuel cell has been proposed as a clean, efficient, and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants, such as hydrogen to the anode and oxygen to the cathode. An MEA and DM preassembled together with a subgasket for the separation of reactant fluids is known as a unitized electrode assembly (UEA).

In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. The electrodes of the fuel cell are generally formed from a finely-divided catalyst. The catalyst may be any electrocatalyst that catalytically supports at least one of an oxidation of hydrogen or methanol, and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, the electrodes, the DM, and a subgasket, for example, in the form of the UEA, are disposed between a pair of fuel cell plates. The pair of fuel cell plates constitutes an anode plate and a cathode plate. Each of the fuel cell plates may have a plurality of channels formed therein for distribution of the reactants and coolant to the fuel cell. The fuel cell plate is typically formed by a conventional process for shaping sheet metal such as stamping, machining, molding, or photo etching through a photolithographic mask, for example. In the case of a bipolar fuel cell plate, the fuel cell plate is typically formed from a pair of unipolar plates, which are then joined to form the bipolar fuel cell plate.

The dimensions of unipolar and bipolar fuel cell plates are known to vary after many of the processing steps associated with manufacture of the fuel cell plates. For example, the fuel cell plates change shape and size due to the stresses and heat history imposed on the fuel cell plates during processing. During a stamping procedure, the fuel plate experiences spring back when it is released from a forming tool. During laser trimming, laser welding, and part-marking procedures, the fuel cell plate shrinks or otherwise distorts due to the heat that is transferred to the fuel cell plate by the lasing.

There is a continuing need for a method of accurately measuring, monitoring, and compensating for physical changes that occur throughout the manufacturing process of a fuel cell plate. Desirably, the measurements can be broken down to a smallest increment of the manufacturing process in order to realize the effects of that particular process on the fuel cell plate and direct process changes to minimize the effects.

SUMMARY OF THE INVENTION

In concordance with the instant disclosure, a method of accurately measuring, monitoring, and compensating for physical changes that occur throughout the manufacturing process of a fuel cell plate, in which the measurements can be broken down to a smallest increment of the manufacturing process in order to realize the effects of that particular process on the fuel cell plate and direct process changes to minimize the effects, is surprisingly discovered.

The present disclosure includes the use of a model such as a mathmodel to define a theoretical or nominal position on a metal plate for a measurement feature to a first axis and a second axis. A procedure such as a stamping of the sheet using a forming tool is the used to stretch or draw the metal plate. Illustratively, the first forming operation may also be used to form the measurement feature of the metal plate. When released from the forming tool, the material of the metal plate springs back. This will cause variation, which a comparison of the measurement feature relative to the theoretical position aids in determining. Additional variation in the metal plate is introduced by subsequent operations, procedures, and processes such as die cutting to remove access material, which will relieve stress and cause additional spring back, and joining processes such as laser welding, which will impart additional changes and shrinkage.

In a first embodiment, a method for measuring a plate for a fuel cell stack includes the step of providing a model of the plate with a first axis and a second axis. The model also has at least one theoretical measurement feature with a theoretical set of coordinates. The plate is also provided with at least one measurement feature. The first axis and the second axis are established relative to the plate. The at least one measurement feature of the plate is then located relative to the first axis and the second axis. The at least one measurement feature is measured to determine a first set of coordinates for the at least one measurement feature. The first set of coordinates of the plate is compared to the theoretical set of coordinates of the model to determine a displacement of the first set of coordinates from the theoretical set of coordinates.

In another embodiment, a method for measuring a plate for a fuel cell stack includes providing a model of the plate including an origin point, a first axis, and a second axis. The model further has at least one theoretical measurement feature with a theoretical set of coordinates. The plate with at least one measurement feature is also provided. The origin point, the first axis, and a second axis are established relative to the plate. The first axis is substantially orthogonal to the second axis. The first axis and the second axis intersect at the origin point. The at least one measurement feature of the plate is located relative to the first axis and the second axis. The at least one measurement feature on the plate is measured to determine a first set of coordinates for the measurement feature. The first set of coordinates of the plate is then compared to the theoretical set of coordinates of the model to determine a displacement of the first set of coordinates from the theoretical set of coordinates.

In a further embodiment, a method for measuring a plate for a fuel cell stack includes providing a model of the plate having an origin point, a first axis, and a second axis. The model further has at least one theoretical measurement feature with a theoretical set of coordinates. The plate having at least one measurement feature and at least one datum hole for aligning the plate is also provided. The at least one datum hole is disposed on a centroid line of the plate. The origin point, the first axis, and the second axis are then established relative to the plate. The first axis is substantially orthogonal to the second axis. The first axis is disposed on the centroid line of the plate. The second axis intersects the first axis at the origin point at the center of the at least one datum hole. The at least one measurement feature is located relative to the first axis and the second axis. The at least one measurement feature on the plate is measured to determine a first set of coordinates for the measurement feature. The first set of coordinates of the plate is compared to the theoretical set of coordinates of the model to determine a displacement of the first set of coordinates from the theoretical set of coordinates. A further procedure is then performed on the plate. The measurement feature is further displaced as a result of the further procedure being performed to compensate for the displacement of the first set of coordinates. The at least one measurement feature is measured after performing the further procedure on the plate to determine a second set of coordinates for the measurement feature. The displacement of the second set of coordinates from the theoretical set of coordinates is less than the displacement of the first set of coordinates from the theoretical set of coordinates.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
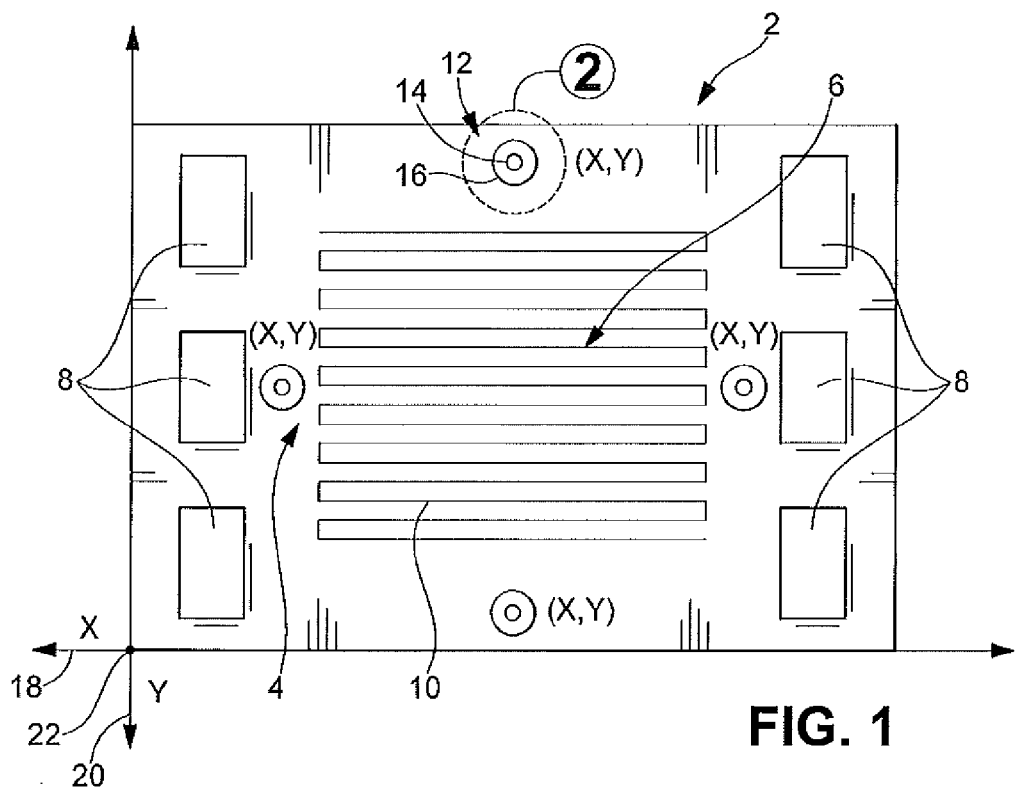
FIG. 1 is a schematic, top plan view of a fuel cell plate according to one embodiment of the present disclosure.
Figure 2:
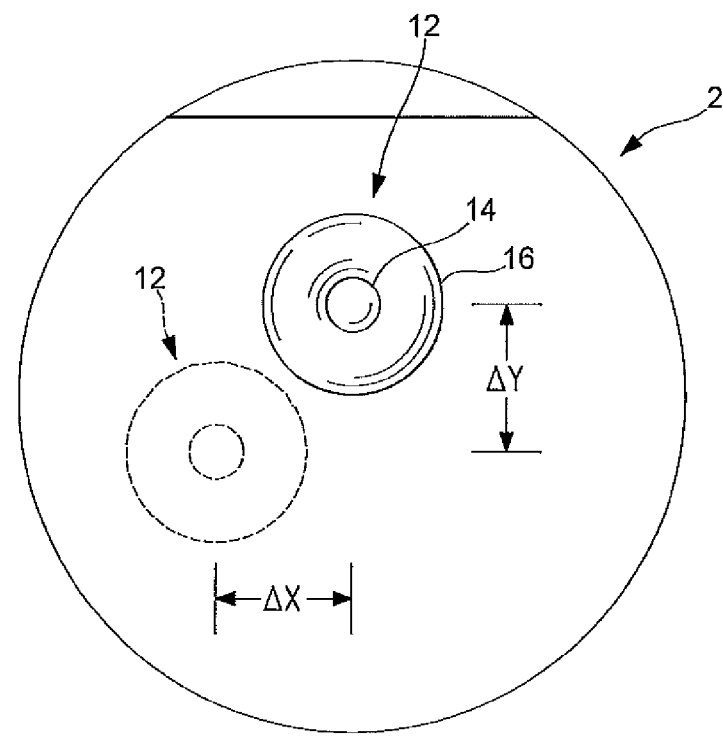
FIG. 2 is an enlarged, fragmentary top plan view of the fuel cell plate illustrated in FIG. 1, and further illustrating a displacement of a measurement feature of the fuel cell plate from a nominal position of a theoretical measurement feature shown in dashed lines.

As shown in FIGS. 1-2, the present disclosure includes a plate 2 for a fuel cell stack (not shown). The plate 2 includes a feed region 4 and an active region 6. The feed region 4 may be disposed between a plurality of manifold apertures 8, which may define manifold inlets and manifold outlets for reactants and coolant of the fuel cell stack when assembled, and the active region 6. The active region 6 may include a flow field 10 having a plurality of flow channels that direct reactants from the inlets to the outlets of the fuel cell stack, in operation.

The plate 2 further has at least one measurement feature 12 formed thereon. The measurement feature 12 may be a functional feature on the plate 2 such as a port or a flow channel, or an otherwise nonfunctional feature formed on the plate 2 for the exclusive purpose of measurement. In a particular embodiment, the measurement feature 12 is a substantially circular dimple 14 disposed in a raised portion 16 on the plate 2. It should be appreciated that rounded dimples 14 are readily located, and center points easily resolved therefrom, by known optical measurement systems. For example, the dimples 14 may be located with an optical concentricity function, as known in the art. Other suitable types and shapes of measurement features 12 may also be employed within the scope of the present disclosure.

The at least one measurement feature 12 may be disposed between the manifold apertures 8 and the flow field 10, for example, as shown in FIG. 1. It may be particularly desirable to form the at least one measurement feature 12 adjacent the feed region, near locations where the plate 2 is expected to experience a strain history or heat history during a manufacturing procedure. In other embodiments, the at least one measurement feature 12 is disposed adjacent a peripheral edge of the plate 2. Where the at least one measurement feature 12 is disposed adjacent the peripheral edge of the plate 2, it should be understood that the at least one measurement feature 12 is also disposed substantially inside of weld locations such as sealing welds on the plate 2. A skilled artisan may select other locations for the at least one measurement feature 12, as desired.

In an illustrative embodiment, the plate 2 includes a plurality of the measurement features 12. For example, two pairs of the measurement features 12 may be positioned approximately mid-span across the plate 2, and generally orthogonal to each other. The plurality of measurement features 12 may include a first measurement feature, a second measurement feature, a third measurement feature, and a fourth measurement feature. The first measurement feature and the third measurement feature are disposed on opposing sides of the flow field 10 and between the manifold apertures 18 and the flow field 10. The second measurement feature and the fourth measurement feature are disposed on opposing sides of the flow field 10 and between the flow field 8 and the peripheral edge of the plate 2. Each of the first measurement feature, the second measurement feature, the third measurement feature, and the fourth measurement feature is disposed inboard of a sealing weld of the plate 2.

In a further embodiment, the measurement features 12 may be disposed in a region including edge features shaped like elongated dimples (not shown) that border the active area channels, the region adjacent the peripheral edge of the plate 2, and centrally located relative to headers of the plate 2. By having the measurement features 12 located centrally, one can determine if the plate 2 is shrinking symmetrically, for example, during a welding procedure. The measurement data may be used to move a location pin for the plate 2 within a weld fixture to center the weld shrinkage so that the final plate 2 is symmetrical when rotated in the horizontal plane.

It should be understood that the plate 2 of the present disclosure may include a unipolar plate or a bipolar plate, as desired. In a certain embodiments, where the plate 2 is a bipolar plate formed from a pair of unipolar plates, the measurement features 12 may be formed on each of the unipolar plates. In a particularly illustrative example, the measurement features 12 are formed on each of an anode unipolar plate and a cathode unipolar plate that is subsequently assembled to form the bipolar plate for use in the fuel cell stack.

Although the invention is described herein with respect to the generalized plate 2 for the fuel cell stack, it should be appreciated that application of the invention to other specific fuel cell plate designs and configurations is also within the scope of the present disclosure. Nonlimiting examples of alternative suitable fuel cell plate designs and configurations for use with the present invention are disclosed in U.S. patent application Ser. No. 12/938,847 to Miller et al., and U.S. patent application Ser. No. 11/752,993 to Newman et al., the entire disclosures of which are hereby incorporated herein by reference. A skilled artisan may select the other specific designs and configurations, as desired.

The present disclosure includes a method for measuring the plate 2. The method first includes the step of providing a model of the plate 2. The model includes a first axis 18 and a second axis 20 and has at least one theoretical measurement feature with a theoretical set of coordinates ($X_t$, $Y_t$). The model may also include an original point 22, for example, where the first axis 18 and the second axis 20 intersect. Where the plate 2 has more than one measurement feature 12, the model may also include more than one theoretical measurement feature. As nonlimiting examples, the model may include a first theoretical measurement feature to which the first measurement feature of the plate 2 corresponds, a second theoretical measurement feature to which the second measurement feature of the plate 2 corresponds, a third theoretical measurement feature to which the third measurement feature of the plate 2 corresponds, and a fourth theoretical measurement feature to which the fourth measurement feature of the plate 2 corresponds. As further nonlimiting examples, the model may be a computer model such as one of a mathematical model and a CAD model. A skilled artisan should appreciate that other numbers of theoretical measurement features and types of models may also be used, as desired.

The method next includes a step of establishing the first axis 18 and the second axis 20 of the model relative to the plate 2. The first axis 18 may be substantially orthogonal to the second axis 20, for example. In a particular embodiment, the first axis 18 is established as an X-axis and the second axis 20 is established as a Y-axis relative to the plate 2. Different orientations may also be used, and other axes may also be established relative to the plate 2, within the scope of the present disclosure.

The step of establishing the first axis 18 and the second axis 20 may also include establishing the origin point 22 of the model relative to the plate 2. For example, the original point 22 may be established at an identifying feature on the plate 2. The origin point 22 may also be established at a point outside of the plate 2, for example, at a position adjacent a corner of the plate 2. In the embodiment shown in FIG. 1, the origin point 22 is established at a peripheral edge of the plate 2, and specifically, at a corner of the substantially rectangular plate 2 shown. Other suitable locations for the origin point 22 may be selected, as desired.

It should be understood that the theoretical set of coordinates ($X_t$, $Y_t$) provide a baseline from which all measurements of the at least one measurement feature 12 may be compared. The locating and measuring of the at least one measurement feature 12, after the at least one measurement feature 12 has been formed on the plate 2 by a procedure such as a stamping procedure, for example, determines a first set of coordinates ($X_1$, $Y_1$) for the measurement feature 12. The theoretical set of coordinates ($X_t$, $Y_t$) may be compared to the first set of coordinates ($X_1$, $Y_1$) in order to determine a relative displacement ($\Delta X$, $\Delta Y$) of the at least one measurement feature 12 relative to a theoretical nominal position. The comparison may be performed by subtracting the first set of coordinates ($X_1$, $Y_1$) from the theoretical set of coordinates ($X_t$, $Y_t$) in order to provide the displacement ($\Delta X$, $\Delta Y$). Alternative means for comparing the first set of coordinates ($X_1$, $Y_1$) to the theoretical set of coordinates ($X_t$, $Y_t$) may also be employed.

Subsequent processes performed on the plate 2 may then be adjusted in order to compensate for the displacement ($\Delta X$, $\Delta Y$) of the at least one measurement feature 12. For example, a further procedure may be performed on the plate 2. The further procedure may include any manufacturing procedure associated with the manufacture of the plate 2 for use in the fuel cell stack. As nonlimiting examples, the further procedure may include at least one of a stamping process, a trimming process, a machining process, and a welding process. The further procedure can result in the application of at least one of a strain history and a heat history to the plate 2, which may affect the local or overall dimensions of the plate 2 following the procedure. For example, materials undergoing stamping processes can exhibit a certain amount of "spring back". Welding processes, in particular, can result in weld shrinkage. Other procedures associated with the manufacture of the plate 2 are also within the scope of the present disclosure.

As established hereinabove, the at least one measurement feature 12 may be displaced from the theoretical set of coordinates ($X_t$, $Y_t$), as well as from the first set of coordinates ($X_1$, $Y_1$), as a result of the further procedure. To determine an extent of the displacement ($\Delta X$, $\Delta Y$), the at least one measurement feature 12 is located and measured after the further procedure is performed on the plate 2 in order to determine a second set of coordinates ($X_2$, $Y_2$) for the measurement feature 12. After the second set of coordinates ($X_2$, $Y_2$) has been determined, the theoretical set of coordinates ($X_t$, $Y_t$) is compared to the second set of coordinates ($X_2$, $Y_2$) to determine the relative displacement ($\Delta X$, $\Delta Y$) of the at least one measurement feature 12. The comparison may be performed by subtracting the second set of coordinates ($X_2$, $Y_2$) from the theoretical set of coordinates ($X_t$, $Y_t$) to provide the displacement ($\Delta X$, $\Delta Y$). Alternative means for comparing the theoretical set of coordinates ($X_t$, $Y_t$) to the second set of coordinates ($X_2$, $Y_2$) may also be employed.

It should be understood that the further procedures performed on the plate 2 may be at least one of selected and adjusted in order to minimize the total displacement ($\Delta X$, $\Delta Y$) of the at least one measurement feature 12 from the theoretical set of coordinates ($X_t$, $Y_t$). For example, the step of adjusting the further procedure may result in the at least one measurement feature 12 having the second set of coordinates ($X_2$, $Y_2$) that are substantially the same as the theoretical set of coordinates ($X_t$, $Y_t$), regardless of the displacement ($\Delta X$, $\Delta Y$) resulting from the first set of coordinates ($X_1$, $Y_1$).

Any further procedures to be performed on the plate 2 may also be adjusted to compensate for the displacement ($\Delta X$, $\Delta Y$) that is expected to occur as a result of subsequent procedures to be performed on the plate 2. The steps of measuring the measurement feature 12, performing the procedure on the plate 2, re-measuring the measurement feature 12, and adjusting the further procedure, may be repeated until the plate 2 has been completed for assembly in the fuel cell stack, and meets desired, predetermined dimensional specifications. For example, where a series of procedures is performed on the plate 2, the procedures may be adjusted so that the displacement ($\Delta X$, $\Delta Y$) of a last set of coordinates from the theoretical set of coordinates ($X_t$, $Y_t$) is less than the displacement of the first set of coordinates (X1, Y1) from the theoretical set of coordinates (Xt, Yt). In particular embodiments, the last set of coordinates will be substantially the same as the theoretical set of coordinates (Xt, Yt).

The method of the present disclosure is also useful for testing new manufacturing methods and new materials. For example, the stepwise displacement ($\Delta X$, $\Delta Y$), determined by repeatedly measuring the measurement feature 12 and performing the procedure on the plate 2, may be monitored until the plate 2 has been completed. The monitoring of the displacement ($\Delta X$, $\Delta Y$) of the measurement feature 12 relative to a known displacement ($\Delta X$, $\Delta Y$), fore example, associated with conventional manufacturing methods and materials, permits one to determine a stability of the plate 2 following a change in manufacturing method or a change in a material used to form the plate 2.

Figure 3:
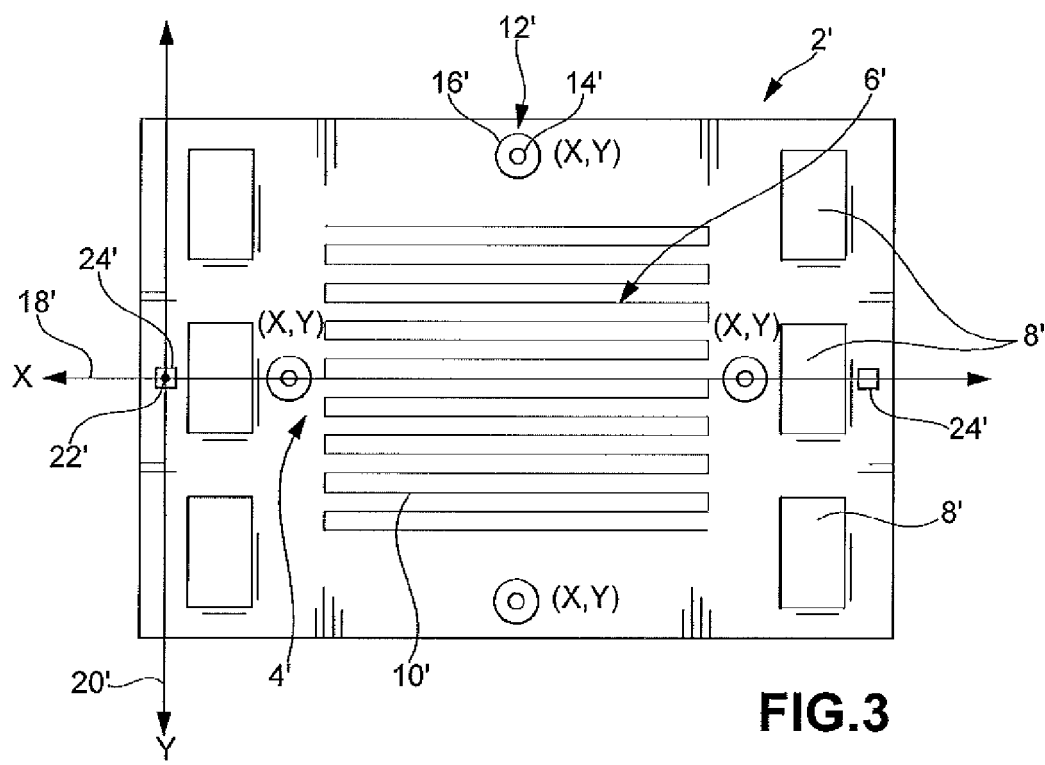
FIG. 3 is a schematic, top plan view of a fuel cell plate according to another embodiment of the present disclosure.

With reference to FIG. 3, a plate 2' is shown in accordance with another embodiment of the invention. Similar structure as shown in FIGS. 1 and 2 has the same reference numeral followed by a prime (') symbol for the purpose of clarity. In FIG. 3, the plate 2' includes at least one datum hole 24' for aligning the plate 2'. The at least one datum hole 24' may also be disposed on a centroid line of the plate 2'. The at least one datum hole 24' may be disposed at other locations on the plate 2', as desired.

Where the plate 2' is used, the origin point 22' may be designated at a center of the at least one datum hole 24'. The method of the disclosure may then include disposing the first axis 18' on the centroid line of the plate 2'. The second axis 20' may be disposed so as to intersect the first axis 18' at the origin point 22' at substantially the center of the at least one datum hole 24'.

A skilled artisan should appreciate that the measurement features 12, 12' advantageously provide reference points that can be easily found with an optical measurement system to measure relative positions to each other and edges of the plate 2, 2'. The measurement features 12, 12' further provide the capability to measure the plate 2, 2' after each step of the manufacturing process in order to determine the effects of each individual procedure on the final plate 2, 2' assembly.

It should also be understood the method of the present disclosure permits one to predict what tool geometry is required so that the final dimensions of the plate 2, 2' substantially match predetermined design specifications for the plate 2, 2', within generally acceptable tolerances. The various measurements of the at least one measurement feature 12, 12' also permit identification of the displacement ($\Delta X$, $\Delta Y$) on an incremental basis throughout the manufacturing process for the plate 2, 2'. Employing the present method, one can realize the effects of particular sub-processes on the plate 2, 2' and direct process and tooling changes to minimize the effects of the particular sub-processes on the overall dimensions of the plate 2, 2'. The measurements can be used to monitor plate 2, 2' stability during process or material changes in order to provide quantitative data for decision making relative to the manufacturing process as a whole.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for measuring a plate for a fuel cell stack, comprising:

providing a model of the plate including a first axis and a second axis and having at least one theoretical measurement feature with a theoretical set of coordinates;

providing the plate having at least one measurement feature;

establishing the first axis and the second axis relative to the plate;

locating the at least one measurement feature of the plate relative to the first axis and the second axis;

measuring the at least one measurement feature to determine a first set of coordinates for the at least one measurement feature; and comparing the first set of coordinates of the plate to the theoretical set of coordinates of the model to determine a displacement of the first set of coordinates from the theoretical set of coordinates.

2. The method of claim 1, wherein the step of providing the plate includes the step of performing a procedure on the plate without the measurement feature, the at least one measurement feature formed by the procedure.

3. The method of claim 1, further comprising the steps of:

performing a further procedure on the plate, the measurement feature being displaced as a result of the further procedure being performed;

measuring the at least one measurement feature after performing the further procedure on the plate to determine a second set of coordinates for the measurement feature; and comparing the second set of coordinates of the plate to the theoretical set of coordinates of the model.

4. The method of claim 1, wherein the step of establishing the first axis and the second axis includes establishing an origin point relative to the plate, the origin point relative to the plate corresponding with an origin point of the model.

5. The method of claim 4, wherein the origin point is established at a peripheral edge of the plate.

6. The method of claim 5, wherein the plate is substantially rectangular and the origin point is established at a corner of the plate.

7. The method of claim 1, wherein the plate includes a plurality of manifold apertures and a flow field, the at least one measurement feature disposed between the manifold apertures and the flow field.

8. The method of claim 7, wherein the at least one theoretical measurement feature includes a first theoretical measurement feature, a second theoretical measurement feature, a third theoretical measurement feature, and a fourth theoretical measurement feature, and the at least one measurement feature includes a first measurement feature corresponding with the first theoretical measurement feature, a second measurement feature corresponding with the second theoretical measurement feature, a third measurement feature corresponding with the third theoretical measurement feature, and a fourth measurement feature corresponding with the fourth theoretical measurement feature.

9. The method of claim 8, wherein the first measurement feature and the third measurement feature are disposed on opposing sides of the flow field and between the manifold apertures and the flow field, and the second measurement feature and the fourth measurement feature are disposed on opposing sides of the flow field and between the flow field and a peripheral edge of the plate, and wherein each of the first measurement feature, the second measurement feature, the third measurement feature, and the fourth measurement feature is disposed inboard of a sealing weld of the plate.

10. The method of claim 4, wherein the plate includes at least one datum hole for aligning the plate, the at least one datum hole disposed on a centroid line of the plate.

11. The method of claim 10, wherein the origin point is established at a center of the at least one datum hole, the first axis disposed on the centroid line of the plate and the second axis intersecting the first axis at the origin point at the center of the at least one datum hole.

12. The method according to claim 3, further comprising the step of adjusting the further procedure to be performed on the plate to minimize the displacement of the at least one measurement feature from the theoretical set of coordinates.

13. The method according to claim 12, wherein the step of adjusting the further procedure results in the second set of coordinates being substantially the same as the theoretical set of coordinates.

14. The method according to claim 3, wherein the further procedure is selected from one of a stamping process, a trimming process, a machining process, and a welding process.

15. The method according to claim 3, wherein the steps of locating the measurement feature and performing the further procedure on the plate are repeated until the plate has been completed for assembly in the fuel cell stack.

16. The method according to claim 15, wherein a displacement of the at least one measurement feature is monitored until the plate has been completed in order to determine plate stability following a change in one of a new manufacturing procedure and a new material used to form the plate.

17. The method according to claim 1, wherein the at least one measurement feature is optically measured.

18. The method of claim 1, wherein the at least one measurement feature includes a dimple disposed in a raise portion formed on the plate.

19. A method for measuring a plate for a fuel cell stack, comprising:
    providing a model of the plate including an origin point, a first axis, and a second axis and having at least one theoretical measurement feature with a theoretical set of coordinates;
    providing the plate having at least one measurement feature;
    establishing the origin point, the first axis, and a second axis relative to the plate, the first axis substantially orthogonal to the second axis, the first axis and the second axis intersecting at the origin point;
    locating the at least one measurement feature relative to the first axis and the second axis;
    measuring the at least one measurement feature on the plate to determine a first set of coordinates for the measurement feature; and
    comparing the first set of coordinates of the plate to the theoretical set of coordinates of the model to determine a displacement of the first set of coordinates from the theoretical set of coordinates.

20. A method for measuring a plate for a fuel cell stack, comprising:
    providing a model of the plate including an origin point, a first axis, and a second axis and having at least one theoretical measurement feature with a theoretical set of coordinates;
    providing the plate having at least one measurement feature and at least one datum hole for aligning the plate, the at least one datum hole disposed on a centroid line of the plate;
    establishing the origin point, the first axis, and the second axis relative to the plate, the first axis substantially orthogonal to the second axis, the first axis disposed on the centroid line of the plate and the second axis intersecting the first axis at the origin point at the center of the at least one datum hole;
    locating the at least one measurement feature relative to the first axis and the second axis;
    measuring the at least one measurement feature on the plate to determine a first set of coordinates for the measurement feature;
    comparing the first set of coordinates of the plate to the theoretical set of coordinates of the model to determine a displacement of the first set of coordinates from the theoretical set of coordinates;
    performing a further procedure on the plate, the measurement feature being further displaced as a result of the further procedure being performed to compensate for the displacement of the first set of coordinates; and
    measuring the at least one measurement feature after performing the further procedure on the plate to determine a second set of coordinates for the measurement feature, wherein the displacement of the second set of coordinates from the theoretical set of coordinates is less than the displacement of the first set of coordinates from the theoretical set of coordinates.

* * * * *